UNITED STATES PATENT OFFICE.

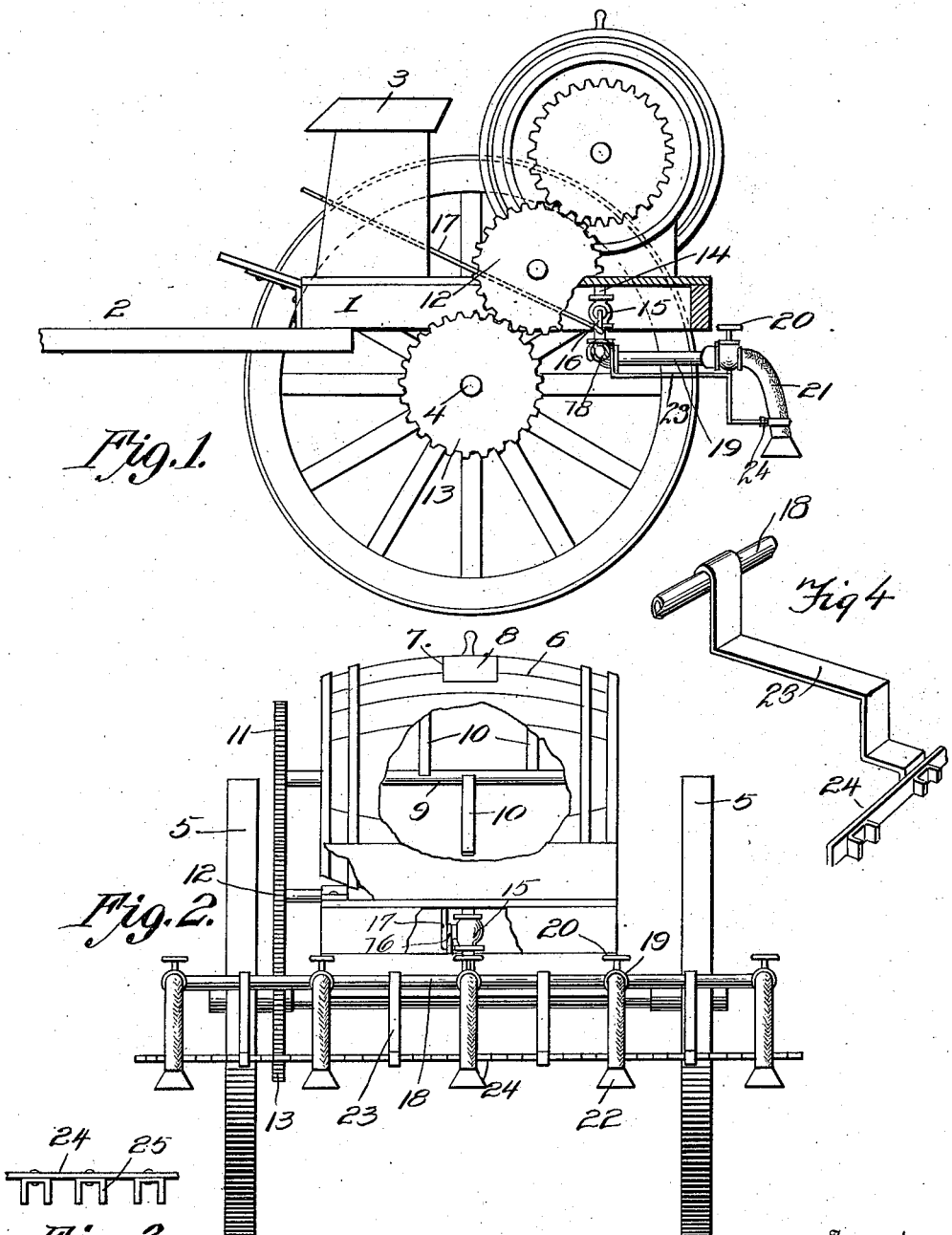

RAYMOND F. NORTH, OF GLENDIVE, MONTANA.

SPRINKLING-MACHINE.

1,014,507.  Specification of Letters Patent.  Patented Jan. 9, 1912.

Application filed August 27, 1909. Serial No. 514,957.

*To all whom it may concern:*

Be it known that I, RAYMOND F. NORTH, a citizen of the United States, residing at Glendive, in the county of Dawson and State of Montana, have invented new and useful Improvements in Sprinkling-Machines, of which the following is a specification.

This invention relates to a machine for spraying or sprinkling vines and plants with an insecticide solution, such as a solution of Paris green and the like, for destroying potato bugs and other insects, and particularly for spraying vegetation planted in rows or hills, the object of the invention being to provide a simple and effective construction of machine of this character embodying means by which the spraying devices may be arranged conveniently at greater or less distances apart according to the distance between the rows.

The invention consists of the features of construction, combination and arrangement of parts hereinafter fully described and claimed, reference being had to the accompanying drawing, in which:—

Figure 1 is a side elevation, partly in section, of a sprinkling machine embodying my invention. Fig. 2 is a rear elevation thereof. Fig. 3 is a detail view of the rack or gage member. Fig. 4 is a similar view showing fragmentarily the method of supporting the same.

The machine comprises a suitable supporting frame 1 carrying a pole, tongue or other draft appliance 2 and a driver's seat 3. The frame 1 is mounted upon a transverse axle 4 journaled in suitable bearings and carrying supporting wheels 5. A barrel or other reservoir 6 is arranged upon the frame in rear of the driver's seat and is provided with an opening 7 for the introduction of the insecticide solution, or for the introduction of water and a solid poisonous substance to be mixed therewith within the reservoir for the production of the solution. A cover 8 is provided for closing the opening 7. An agitator comprising a shaft 9 carrying a series of paddles or blades 10 is arranged within the barrel or reservoir whereby the solution may be effected or the contents kept agitated to always maintain the solution at a desired strength. The shaft 9 extends longitudinally within the reservoir and is journaled in suitable bearings therein and has an exteriorly projecting end carrying a gear wheel 11 meshing with an idle gear 12 journaled on the frame and which in turn meshes with a drive gear 13 on the axle 4, whereby the agitator is driven when the machine is in motion. From the agitator extends a discharge pipe 14 having a controlling valve 15 therein, the stem of which valve is provided with a crank arm 16 connected with one end of an operating lever or link 17 having its opposite end arranged adjacent to the driver's seat so that it may be manipulated to control the discharge of the insecticide solution. The pipe 14 communicates with a horizontal transversely extending distributing pipe 18 arranged below the frame in rear of the axle and provided with a series of rearwardly extending branches 19 each provided with a controlling valve 20. Coupled to the branches 19 are flexible discharge tubes 21, which depend at the rear of the vehicle, and are provided at their lower ends with suitable roses or sprinkler heads 22. It will thus be seen that the main supply of the solution to the distributing pipe may be controlled, as well as the supply of the solution to the individual discharge pipes.

Angular or stepped bracket arms 23 are fixed at their upper forward ends to the distributing pipe 18, and thence project downwardly and rearwardly therefrom to a position below and in rear of the valves 20, the lower free ends of said arms being attached to a transverse rack or supporting bar 24, provided at intervals with spaced holders 25, in the form of forks of sufficient size to receive the flexible discharge pipes 21. The bracket arms lie wholly below the plane of the branches 19 of the distributing pipe, and are angularly bent or stepped to increase their strength and resistance to flexion in a vertical plane, by which they are rendered stiff enough to support the bar 24 without the necessity of bracing them from said branches 19 or any other portion of the machine. The bar 24 is disposed at a sufficient point below and in rear of the valved ends 20 of the branches 19 to adapt the flexible discharge pipes 21 to hang in a downwardly bent or pendent position when fitted within the holders 25. By this means the said discharge pipes will be held in such manner as to relieve them from the strain of supporting their own weight, preventing possible rupture of said pipes at their point of bend. This is of material importance in making the pipes 21 wholly or partially of rubber, which is liable to deteriorate and in course of time break when bent and subjected to strain.

In the operation of the device, the machine is driven across the field or along the rows of plants in the garden and the valve 15 opened for the discharge of the solution through the flexible discharge pipes, which, by means of the valves 20, may be controlled to discharge streams of spray at desired intervals apart and to vary the force or volume of the streams as occasion requires. By opening the valves 20 connected with certain of the flexible discharge pipes, some of the pipes may be thrown into action and others left out of action to regulate the distance between the discharging streams to suit the distance between the rows or hills of plants to be sprayed. In addition the discharge pipes 21 may be arranged at varying intervals apart by adjusting them into engagement with any of the holders 25 of the rack bar 24 within their range of movement, as will be readily understood, thus enabling a sufficiently fine relative adjustment to be obtained to suit all practical purposes in spraying plants arranged at any desired intervals apart.

I claim:—

1. A sprinkling apparatus of the character described comprising a wheeled frame, a reservoir superposed upon the rear portion of the frame and having a downwardly extending discharge pipe, an elevated driver's seat at the forward end of the frame, a transversely extending distributing pipe arranged beneath the frame and communicating centrally with said discharge pipe, a series of horizontal parallel branch pipes arranged at intervals along said distributing pipe and extending therefrom beyond the rear of the frame, each of said branch pipes having a controlling valve at its free end, flexible discharge nozzles coupled to and depending from the valved free ends of said branch pipes, stepped bracket arms connected with the distributing pipe at points between said horizontal branch pipes and extending downwardly and rearwardly from said distributing pipe to a point in rear of and below the valved ends of said horizontal branch pipes, a transversely arranged suppending from the valved free ends of said bracket arms and disposed below and in rear of said branch pipes, said bar being provided at spaced intervals with forked holders to loosely receive the ends of the nozzles, a controlling valve arranged in the discharge pipe and having an operating crank, and an operating rod pivotally connected with said crank and extending forwardly beneath the driver's seat to a position in advance thereof.

2. In a sprinkling apparatus, a supporting frame, a reservoir mounted thereon, a transverse distributing pipe communicating with the reservoir, a series of branch pipes communicating with said distributing pipe, flexible discharge nozzles depending from the free ends of said branch pipes, bracket arms carried by the distributing pipe, and a nozzle supporting bar carried by said bracket arms and having forked holders to receive said nozzles.

3. In a sprinkling apparatus, a supporting frame, a reservoir thereon, a transverse distributing pipe communicating with the reservoir, branch pipes leading therefrom, flexible nozzles coupled to said branch pipes, bracket arms upon the distributing pipe between the branch pipes, and a bar carried by said bracket arms and having forked holders to receive said flexible nozzles.

In testimony whereof I affix my signature in presence of two witnesses.

RAYMOND F. NORTH.

Witnesses:
R. L. WYMAN,
LAURETTA M. HANNEGAN.

---

Copies of this patent may be obtained for five cents each, by addressing the "Commissioner of Patents, Washington, D. C."